(12) United States Patent
Choi et al.

(10) Patent No.: US 10,010,839 B2
(45) Date of Patent: *Jul. 3, 2018

(54) PROCESS TO UPGRADE HIGHLY WAXY CRUDE OIL BY HOT PRESSURIZED WATER

(75) Inventors: Ki-Hyouk Choi, Dhahran (SA); Khalid Ali Al-majnouni, Dhahran (SA); Ali Al-Shareef, Qatif (SA)

(73) Assignee: Saudi Arabian Oil Company (SA)

( * ) Notice: Subject to any disclaimer, the term of this patent is extended or adjusted under 35 U.S.C. 154(b) by 982 days.

This patent is subject to a terminal disclaimer.

(21) Appl. No.: 12/277,263

(22) Filed: Nov. 24, 2008

(65) Prior Publication Data

US 2009/0178952 A1   Jul. 16, 2009

Related U.S. Application Data

(60) Provisional application No. 60/990,662, filed on Nov. 28, 2007, provisional application No. 60/990,648, (Continued)

(51) Int. Cl.
| | |
|---|---|
| *C10G 9/00* | (2006.01) |
| *B01J 3/00* | (2006.01) |
| *C10G 31/08* | (2006.01) |
| *C10G 45/26* | (2006.01) |
| *C10G 47/32* | (2006.01) |

(Continued)

(52) U.S. Cl.
CPC .............. *B01J 3/008* (2013.01); *C10G 9/00* (2013.01); *C10G 31/08* (2013.01); *C10G 45/26* (2013.01); *C10G 47/32* (2013.01); *C10G 75/00* (2013.01); *E21B 43/16* (2013.01); *C10G 2300/1033* (2013.01); *C10G 2300/202* (2013.01); *C10G 2300/205* (2013.01); *C10G 2300/206* (2013.01); *C10G 2300/4081* (2013.01); *C10G 2300/805* (2013.01)

(58) Field of Classification Search
CPC ..................... C10G 2400/20; C10G 2300/807; C10G 9/36; C10G 9/00; C10G 9/20
USPC ....................... 208/106, 130–132, 49, 56, 27
See application file for complete search history.

(56) References Cited

U.S. PATENT DOCUMENTS

| | | |
|---|---|---|
| 2,135,332 A | 11/1938 | Gary |
| 2,623,596 A | 12/1952 | Whorton et al. |

(Continued)

FOREIGN PATENT DOCUMENTS

| | | |
|---|---|---|
| EP | 199555 | 10/1986 |
| EP | 423960 | 4/1991 |

(Continued)

OTHER PUBLICATIONS

Subramanian, Compositional Analysis of Bitumen and Bitumen-Derived Products, Jan. 1996, Journal of Chromatographic Science, vol. 34, pp. 20-22.*

(Continued)

*Primary Examiner* — Michelle Stein
(74) *Attorney, Agent, or Firm* — Bracewell LLP; Constance Gall Rhebergen

(57) ABSTRACT

A continuous process for upgrading highly waxy crude oil by contacting the highly waxy crude oil with supercritical water fluid to produce low pour point, high value crude oil having low sulfur, low nitrogen, and low metallic impurities for use as hydrocarbon feedstock.

10 Claims, 3 Drawing Sheets

Related U.S. Application Data filed on Nov. 28, 2007, provisional application No. 60/990,658, filed on Nov. 28, 2007, provisional application No. 60/990,670, filed on Nov. 28, 2007, provisional application No. 60/990,641, filed on Nov. 28, 2007.

(51) Int. Cl.
*C10G 75/00* (2006.01)
*E21B 43/16* (2006.01)

(56) References Cited

U.S. PATENT DOCUMENTS

| | | | |
|---|---|---|---|
| 3,325,395 A * | 6/1967 | Ban | 208/410 |
| 3,948,754 A | 4/1976 | McCollum et al. | |
| 3,948,755 A | 4/1976 | McCollum et al. | |
| 3,960,706 A | 6/1976 | McCollum et al. | |
| 3,983,027 A | 9/1976 | McCollum et al. | |
| 3,989,618 A * | 11/1976 | McCollum et al. | 208/106 |
| 4,005,005 A | 1/1977 | McCollum et al. | |
| 4,118,797 A | 10/1978 | Tarpley, Jr. | |
| 4,243,514 A * | 1/1981 | Bartholic | 208/91 |
| 4,243,633 A | 1/1981 | Hozuma et al. | |
| 4,443,325 A | 4/1984 | Chen et al. | |
| 4,446,012 A | 5/1984 | Murthy et al. | |
| 4,448,251 A | 5/1984 | Stine | |
| 4,483,761 A | 11/1984 | Paspek, Jr. | |
| 4,529,037 A | 7/1985 | Froning et al. | |
| 4,543,177 A | 9/1985 | Murthy et al. | |
| 4,543,190 A * | 9/1985 | Modell | 210/721 |
| 4,550,198 A | 10/1985 | Myerson | |
| 4,684,372 A | 8/1987 | Hayes et al. | |
| 4,733,724 A | 3/1988 | Cardenas | |
| 4,753,666 A | 6/1988 | Pastor et al. | |
| 4,813,370 A | 3/1989 | Capamaggio | |
| 4,818,370 A | 4/1989 | Gregoli et al. | |
| 4,840,725 A * | 6/1989 | Paspek | 208/130 |
| 4,951,561 A * | 8/1990 | Moorman et al. | 99/471 |
| 5,096,567 A | 3/1992 | Paspek, Jr. et al. | |
| 5,110,443 A | 5/1992 | Gregoli et al. | |
| 5,133,877 A * | 7/1992 | Rofer et al. | 588/316 |
| 5,316,659 A | 5/1994 | Brons et al. | |
| 5,466,365 A | 11/1995 | Savastano et al. | |
| 5,496,464 A | 3/1996 | Piskorz et al. | |
| 5,674,405 A | 10/1997 | Bourhis et al. | |
| 5,725,054 A | 3/1998 | Shayegi et al. | |
| 5,778,977 A | 7/1998 | Bowzer et al. | |
| 5,851,381 A | 12/1998 | Tanaka et al. | |
| 5,871,636 A | 2/1999 | Trachte et al. | |
| 5,871,637 A | 2/1999 | Brons | |
| 5,885,440 A | 3/1999 | Hoehn et al. | |
| 5,904,839 A | 5/1999 | Brons | |
| 5,914,031 A | 6/1999 | Sentagnes et al. | |
| 5,928,502 A | 7/1999 | Bearden et al. | |
| 6,280,408 B1 * | 8/2001 | Sipin | 604/65 |
| 6,325,921 B1 | 12/2001 | Andersen | |
| 6,328,104 B1 | 12/2001 | Graue | |
| 6,475,396 B1 | 11/2002 | Wofford, III et al. | |
| 6,489,263 B2 * | 12/2002 | Murray et al. | 502/155 |
| 6,547,957 B1 | 4/2003 | Sudhakar et al. | |
| 6,709,601 B2 | 3/2004 | Wofford, III et al. | |
| 6,764,213 B2 | 7/2004 | Shechter | |
| 6,767,452 B1 | 7/2004 | Siskin et al. | |
| 6,878,290 B2 | 4/2005 | Joussot-Dubien et al. | |
| 7,144,498 B2 | 12/2006 | McCall et al. | |
| 7,740,065 B2 | 6/2010 | Choi | |
| 8,025,790 B2 * | 9/2011 | Choi | C10G 9/00 208/106 |
| 8,815,081 B2 * | 8/2014 | Choi | C10G 9/00 208/107 |
| 2001/0035006 A1 | 11/2001 | Dou et al. | |
| 2002/0046838 A1 | 4/2002 | Karanikas et al. | |
| 2002/0173682 A1 | 11/2002 | Tullio et al. | |
| 2003/0168381 A1 | 9/2003 | Hokan et al. | |
| 2005/0167333 A1 | 8/2005 | McCall et al. | |
| 2006/0011511 A1 | 1/2006 | Hokan et al. | |
| 2006/0042999 A1 | 3/2006 | Iqbal et al. | |
| 2006/0157339 A1 | 7/2006 | Cullen | |
| 2006/0231455 A1 | 10/2006 | Olsvik et al. | |
| 2007/0045881 A1 | 3/2007 | Berkowitz et al. | |
| 2007/0056881 A1 | 3/2007 | Berkowitz et al. | |
| 2007/0090021 A1 | 4/2007 | McCall et al. | |
| 2007/0140935 A1 | 6/2007 | Hazlebeck | |
| 2007/0289898 A1 | 12/2007 | Banerjee | |
| 2008/0066918 A1 | 3/2008 | Smith | |
| 2008/0073292 A1 | 3/2008 | Stenmark et al. | |
| 2008/0099373 A1 | 5/2008 | Hokari et al. | |
| 2008/0099374 A1 | 5/2008 | He et al. | |
| 2008/0099376 A1 | 5/2008 | He et al. | |
| 2008/0099377 A1 | 5/2008 | He et al. | |
| 2008/0099378 A1 | 5/2008 | He et al. | |
| 2008/0121565 A1 | 5/2008 | Yoo et al. | |
| 2008/0149533 A1 | 6/2008 | Yoo et al. | |
| 2008/0264873 A1 | 10/2008 | Gidner | |
| 2009/0008291 A1 | 1/2009 | Chabot et al. | |
| 2009/0145805 A1 | 6/2009 | Choi | |
| 2009/0178952 A1 | 7/2009 | Choi et al. | |
| 2011/0147266 A1 | 6/2011 | Choi | |

FOREIGN PATENT DOCUMENTS

| | | |
|---|---|---|
| EP | 0978552 A2 | 2/2000 |
| EP | 1342771 | 9/2003 |
| EP | 1505141 | 2/2005 |
| EP | 1537912 | 6/2005 |
| EP | 1616931 | 1/2006 |
| EP | 1826527 | 8/2007 |
| JP | 2000-104311 | 9/1998 |
| JP | 2000-109850 | 10/1998 |
| JP | 2001-192676 | 1/2000 |
| JP | 2000-282063 | 10/2000 |
| JP | 2003-277770 | 3/2002 |
| JP | 2003-049180 | 2/2003 |
| JP | 2006-104311 | 4/2006 |
| WO | 02072735 A2 | 9/2002 |
| WO | WO 2005-007776 | 1/2005 |
| WO | 2006037368 A1 | 4/2006 |
| WO | WO 2008-085436 | 7/2008 |
| WO | 2009085436 A1 | 7/2009 |
| WO | 2009085461 A1 | 7/2009 |

OTHER PUBLICATIONS

Adschiri et al. "Hydrogenation through Partial Oxidation of Hydrocarbon in Supercritical Water", published on Int. J. of the Soc. of Mat. Eng. for Resources, vol. 7, No. 2, pp. 273-281, (1999).

Adschiri et al. "Catalytic Hydrodesulfurization of Dibenzothiophene through Partial Oxidation and a Water-Gas Shift Reaction in Supercritical Water", published on Ind. Eng. Chem. Res., vol. 37, pp. 2634-2638, (1998).

Zhao et al. "Experimental Study on Vacuum Residuum Upgrading through Pyrolysis in Supercritical Water", published on Energy & Fuels, vol. 20, pp. 2067-2071, (2006).

M.A. McHugh & V.J. Krukonis "Supercritical Fluid Extraction", 2nd ed., Butterworth-Heinemann, 1994, pp. 339-416.

Seid Mahdi Jafari et al., "Production of sub-micron emulsions by ultrasound and microfluidization techniques;" Journal of Food Engineering, vol. 82, Science Direct, 2007, pp. 478-488, Elsevier Ltd.

Jiunn-Ren Lin et al., "An Upgrading Process Through Cavitation and Surfactant," Energy & Fuels 1993, vol. 7, pp. 111-118, American Chemical Society.

B. Abismail et al., "Emulsification by ultrasound: drop size distribution and stability," Ultrasonics Sonochemistry, vol. 6, 1999, pp. 75-83, Elsevier Science B.V.

T.S.H. Leong et al., "Minimising oil droplet size using ultrasonic emulsification," Ultrasonics Sonochemistry vol. 16, 2009, pp. 721-727, Elsevier B.V.

S. Kentish et al., "The use of ultrasonics for nanoemulsion preparation," Innovative Food Science and Emerging Technologies, vol. 9, 2008, pp. 170-175, Elsevier Ltd.

(56) References Cited

OTHER PUBLICATIONS

Ancheyta, Jorge; Petroleum Refining; Modeling and Simulation of Catalytic Reactors for Petroleum Refining, First Edition; 2011; pp. 1-52; John Wiley & Sons, Inc.

PCT International Search Report dated Jan. 3, 2011, International Application No. PCT/US2010/060728.

Sato, Takafumi et al., "Upgrading of Asphalt With and Without Partial Oxidation in Supercritical Water," Fuel 82 (2003) pp. 1231-1239, Elsevier.

Choi et al., "Petroleum Upgrading Process," U.S. Appl. No. 12/881,807, filed Sep. 14, 2010.

International Search Report and Written Opinion issued in PCT/US2011/051183 dated Nov. 23, 2011, 10 pgs.

R.J. Parker et al., "Liquefaction of Black Thunder Coal with Counterflow Reactor Technology," Ninth Pittsburgh Coal Conference Oct. 1992, Oct. 31, 1992, pp. 1191-1195.

Department of Trade of Industry of the United Kingdom, "Technology Status Report—Coal Liquefaction," Cleaner Coal Technology Programme, Oct. 31, 1999, pp. 1-14.

Amestica, L.A. and Wolf, E.E., Catalytic Liquefaction of Coal with Supercritical Water/CO/Solvent Media, XP-002663069, Fuel, Sep. 30, 1986, pp. 1226-1332, vol. 65, Butterworth & Co. (1986).

Robinson, P.R. and Kraus, L,S., Thermocheminstry of Coking in Hydroprocessing Units: Modeling Competitive Naphthalene Saturation and Condensation Reactions, XP-002663070, Apr. 26, 2006, Retrieved from Internet (see attached PCT Int'l Search Report dated Nov. 21, 2011).

PCT International Search Report dated Nov. 21, 2011 for International Application No. PCT/US2011/051192, International Filing Date Sep. 12, 2011.

Hemmingsen et al. "Structural Characterization and Interfacial Behavior of Acidic Compounds Extracted from a North Sea Oil", Energy & Fuels, in press, (2006).

Laredo et al. "Identification of Naphthenic Acids and Other Corrosivity-related Characteristics in Crude Oil and Vacuum Gas Oils from a Mexican Refinery", Energy & Fuels, vol. 18, pp. 1687-1694, (2004).

Manning et al. "Chapter 2: Characterization of Crude Oils" Oilfield Processing, vol. Two: Crude Oil, 1995, pp. 5-23.

N.A. Tomczyk & R.E. Winans "On the nature and Origin of Acidic Species in Petroleum. 1. Detailed Acid Type Distribution in a California Crude Oil", Energy & Fuels, vol. 15, pp. 1498-1504, (2001).

Saab et al. "Quantitative Extraction Procedure of Naphthenic Acids Contained in Crude Oils. Characterization with Different spectroscopic Methods", Energy & Fuels, vol. 19, pp. 525-531, (2005).

Watanabe et al. "Decomposition of a Long Chain Saturated Fatty Acid with Some Additives in Hot Compressed Water", Energy Conversion and management, in press, (2006).

Williams "Refiners' Future Survival Hinges on Adapting to Changing Feedstocks, Product Specs", Oil & Gas Journal, vol. 101, No. 31, (2003).

Wiehe, "A Phase-Separation Kinetic Model for Coke Formation", 32 Ind. Eng. Chem. Res. (1993), pp. 2447-2454.

Alshareef et al., "Effect of Chemical Structure on the Cracking and Coking of Archipelago Model Compounds Representative of Asphaltenes", 26 Energy Fuels (2012), pp. 1828-1843.

* cited by examiner

PROCESS TO UPGRADE HIGHLY WAXY CRUDE OIL BY HOT PRESSURIZED WATER

RELATED APPLICATIONS

This patent application claims priority to U.S. Provisional Patent Application Ser. Nos. 60/990,658; 60/990,648; 60/990,662; 60/990,670; and 60/990,641 filed on Nov. 28, 2007, which are all incorporated by reference in their entirety.

TECHNICAL FIELD OF THE INVENTION

The present invention relates to a continuous process for upgrading highly waxy crude oil by contacting the highly waxy crude oil with supercritical water fluid to produce low pour point, high value crude oil having low sulfur, low nitrogen, and low metallic impurities for use as hydrocarbon feedstock.

BACKGROUND OF THE INVENTION

Pipelines and tankers have long been utilized for transporting crude oil over long distances. It is recognized that conventional crude oils have adequate properties to allow for transfer of the crude oils through these pipelines and tankers. These properties include low pour point, low cloud point and low viscosity.

Increasing demand for petroleum feedstocks and decreasing quality of available conventional crude oils require upgrading of other potential sources, such as non-conventional crude oils, for use in current refining processes.

Highly waxy crude oil is regarded as a non-conventional crude oil petroleum source. Highly waxy crude oil contains large amounts of high boiling point and high molecular weight paraffinic compounds, which result in a high pour point and restricts the crude oil's transfer capability through pipelines. Therefore, it is highly desired to upgrade highly waxy crude oil at the production site before transferring through pipelines.

Also, low levels of aromatic and olefinic compounds in the crude oil often necessitate further hydroprocessing in order to meet fuel specifications, such as octane rating of gasoline. Many refineries perform hydroprocessing after distilling crude oil into various fractions, meaning each fraction must be hydroprocessed separately. In general, large amounts of hydrogen are required to adjust the properties of the various fractions for meeting required specifications.

Also, due to the very low content of unsaturated hydrocarbons contained in highly waxy crude oil, it is inadequate as a feedstock for certain refining processes and petrochemical processes. For example, straight-run naphtha from highly waxy crude oil requires severe reforming treatments to increase aromatic and olefinic contents for improving octane rating of motor gasoline.

A number of processes have been suggested to upgrade highly waxy crude oil to increase the content of unsaturated hydrocarbons and produce improved pour point flowing properties for easy transferring. For example, the high pour point of highly waxy crude oil can be decreased by thermal coking, catalytic hydrocracking, solvent dewaxing, and/or adding pour point depressants.

Thermal coking is one of the possible processes to upgrade highly waxy crude oil to improve pour point and flow properties for transferring through conventional pipelines and tankers. Cracking, which occurs during thermal coking, breaks paraffinic bonds to produce low boiling point hydrocarbons and unsaturated hydrocarbons. As a result, aromatic and olefinic contents of highly waxy crude oil are increased and pour point is decreased. Thermal coking, however, produces large amounts of solid coke as a by-product, which means large losses of valuable hydrocarbon feedstock. Also, significant amounts of highly waxy crude oil are converted to low value coke, which causes problems in operating in a continuous fashion.

Upgrading of highly waxy crude oil can be possible through conventional catalytic hydrocracking. However, such treatments require large amounts of hydrogen and regular replacement of catalyst, leading to increased operating costs. Furthermore, it is not easy to install such treatment processes at crude oil production sites because of the complexity of the process equipment.

Solvent dewaxing process is a well-known process to separate the waxy portion from the matrix. Methyl ethyl ketone (MEK), toluene and propane have been used for wax separation. Solvent dewaxing, however, requires large amounts of solvent and expensive solvent recovering and wax disposing systems.

Additives to depress the pour point of highly waxy crude oil have also been proposed. Using a pour point depressor to improve flowing properties of highly waxy crude oil requires high operating costs. Additionally, pour point depressors adversely affect the quality of end products.

Supercritical water has been utilized as a reaction medium for cracking of hydrocarbons with the addition of an external source of hydrogen. Water has a critical temperature of about 705° F. (374° C.) and a critical pressure of about 22.1 MPa. Above these conditions, the phase boundary between liquid and gas for water disappears, with the resulting supercritical water exhibiting high solubility toward organic compounds and high miscibility with gases. Furthermore, supercritical water stabilizes radical species.

However, utilizing supercritical water in the manner described as the reaction media for cracking has some disadvantages such as coke formation, which occurs during the upgrading of hydrocarbons in the supercritical water fluid. Non-waxy crude oil, or heavy crude oil, has a low hydrogen/carbon ration of the matrix which can produce coke. When coke accumulates inside a reactor, the coke acts as an insulator and effectively blocks the heat from radiating throughout the reactor, leading to increased energy costs, since the operator must increase the operating temperature to offset for the build-up. Furthermore, accumulated coke can also increase the pressure drop throughout the process line, causing additional increases in energy costs. Although the amount of coke produced from upgrading hydrocarbons in this manner is less than that produced by conventional thermal coking processes, coking must be minimized to increase liquid yield and improve the overall stability of process operation.

It is known in the industry that coke formation occurs in cracking using supercritical water if there is only a limited availability of hydrogen. Several proposals have been suggested to supply external hydrogen to a feed hydrocarbon treated with supercritical water fluid. For example, hydrogen gas can be added directly to the feed stream. Carbon monoxide can also be added directly to the feed stream to generate hydrogen through a water-gas-shift (WGS) reaction between carbon monoxide and water. Organic substances such as formic acid can also be added to the feed stream to generate hydrogen through a WGS reaction with carbon monoxide, which is produced from decomposition of added organic substances and water. Additionally, a small amount of oxygen can be included in the feed stream to allow for oxidation within the feed matrix for generating carbon monoxide. This carbon monoxide can then be used in a WGS reaction for producing hydrogen. However, feeding any external gas into a liquid stream increases costs and introduces added complexity to the process.

Highly waxy crude oil contains substantial quantities of paraffinic compounds that have elevated boiling points and considerable molecular weights. These properties result in high pour points and difficulties in the transferring capability of the crude oil through pipelines and oil tankers. Thus, highly waxy crude oil has come to be regarded as a non-conventional petroleum source.

Upgrading of highly waxy crude oil is possible through conventional thermal or catalytic cracking, but such treatment produces substantial amounts of coke and consumes large amounts of hydrogen and catalyst. In addition to thermal and catalytic cracking, the problems caused by the high pour point of highly waxy crude oil can be reduced by solvent dewaxing and/or addition of pour point depressants. However, all of these methods suffer disadvantages.

As noted earlier, thermal coking produces large amounts of solid coke as a by-product, which is an indicator of the loss of valuable hydrocarbon feedstock. Catalytic hydrocracking requires large amounts of hydrogen and the regular replacement of spent catalyst. Solvent dewaxing requires a wax disposing system and a solvent recovery system, which adds to complexity and expense. Pour point depressants are expensive and change the end product in undesirable ways.

Therefore, it would be desirable to have an improved process for upgrading and depressing the pour point of highly waxy crude oil that does not require: an external supply of hydrogen, the presence of an externally supplied catalyst, the use of solvents, or the use of pour point depressors. Furthermore, it would be desirable to have a process that did not result in the creation of large amounts of coke, such that the process could be run continuously. Additionally, it would be advantageous if the process could be implemented at the production site without the use of complex equipment.

SUMMARY OF THE INVENTION

The present invention is directed to a continuous process that satisfies at least one of these needs. One embodiment of the present invention provides a continuous process for converting highly waxy crude oil to low pour point hydrocarbon feedstock that is suitable for transferring through conventional pipelines and tankers. The low pour point crude oil is prepared by utilizing hot pressurized water, also called supercritical water fluid. This is conducted without an external supply of hydrogen or externally supplied catalyst. Contacting of the highly waxy crude oil with supercritical water results in cracking of some of the high pour point and other large paraffinic components, yielding upgraded oil that has a lower pour point and lower paraffinic content as compared to the highly waxy crude oil.

In an embodiment of the present invention, the continuous process for lowering the pour point and paraffinic content of highly waxy crude oil can include mixing the highly waxy crude oil with hot pressurized water in a mixing zone to form a highly waxy crude oil/water mixture, wherein the mixing ratio of water and highly waxy crude oil, as measured at room temperature, is in the range of 10:1 wt/wt and 1:10 wt/wt. The temperature of the hot pressurized water is selected such that the resulting highly waxy crude oil/water mixture defines physical properties that allow the highly waxy crude oil/water mixture to be suitable for pumping, wherein the temperature of the highly waxy crude oil/water mixture does not exceed 150 degrees C.

The highly waxy crude oil/water mixture is then pumped through a heating zone to create a pre-heated mixture. This pre-heated mixture is then fed into a reaction zone, and the temperature is increased such that at least some of the hydrocarbons of the pre-heated mixture undergo cracking to create a hot adapted-mixture. In an embodiment of the present invention, the reaction zone comprises an interior portion of a first reactor, the first reactor operable to withstand temperatures and pressures in excess of the critical temperature and critical pressure of water. In a further embodiment of the present invention, the reaction zone is essentially free of an externally-provided catalyst, essentially free of an externally-provided hydrogen source, and essentially free of an externally-provided pour point depressant additive. The hot adapted-mixture is then removed from the reaction zone and cooled before it is separated into upgraded oil and recovered water. The upgraded oil is defined by a lower pour point and/or a lower paraffinic content as compared to the highly waxy crude oil, which gives the crude product improved flowing properties for a more effective transfer in pipelines and tankers. Advantageously, the use of highly waxy crude oil reduces coke formation over heavy crude oil as the high hydrogen/carbon ratio of matrix for highly waxy crude oil suppresses coke formation from heavy crude oil.

In an alternate embodiment, the reaction zone further comprises an interior portion of a second reactor, the second reactor operable to further heat the pre-heated mixture to temperatures at or above the critical temperature of water. In a further embodiment, the second reactor can be a jacketed pipe that is a heat-conducting pipe that is operable to withstand a temperature up to 1112° F. (600° C.) while maintaining pressure above the critical pressure of water. In yet another further embodiment, the first reactor is a vertically oriented reactor, such that the pre-heated mixture flows downwardly through the vertically oriented reactor.

In an alternate embodiment of the present invention, the continuous process for lowering the pour point and paraffinic content of highly waxy crude oil can include mixing the highly waxy crude oil with the water feed at a slightly elevated temperature to form the highly waxy crude oil/water mixture, the temperature being selected in a range such that the highly waxy crude oil/water mixture at the slightly elevated temperature is readily capable of being pumped, wherein the slightly elevated temperature does not exceed 150 degrees C., wherein the mixing ratio of water and highly waxy crude oil, as measured at room temperature, is in the range of 10:1 wt/wt and 1:10 wt/wt.

The highly waxy crude oil/water mixture is then pumped to the heating zone, wherein it is heated to a temperature in the range of about 150° C. to 350° C. to form the pre-heated mixture. The pre-heated mixture is then fed into a reaction zone, wherein the temperature is increased to the target temperature that is at or above the critical temperature of water, such that at least some of the hydrocarbons of the pre-heated mixture undergo cracking, forming the hot, adapted-mixture, the reaction zone being essentially free of an externally-provided catalyst and essentially free of an externally-provided hydrogen source. The hot adapted-mixture is then cooled down and undergoes a pressure reduction by a pressure regulating device forming the pressure-reduced adapted-mixture. The pressure regulating device is preferably a back pressure regulator, and more preferably two or more back pressure regulators in parallel. The depressurized adapted-mixture is then separated into the gas portion and the liquid portion using at least one liquid-gas separator, and the liquid portion is separated into upgraded oil and recovered water using at least one oil-water separator. The upgraded oil recovered from the oil-water separator is a crude oil having a reduced point as compared to the highly waxy crude oil.

In an alternate embodiment, the recovered water can be oxidized under supercritical conditions to form the treated water stream, wherein the treated water stream is then recycled back into the process by combining the treated water stream with the water feed. In an additional embodiment, the thermal energy contained in the hot adapted-mixture from the reaction zone and/or the treated water stream from the oxidation step can be captured and made operable for use for heat exchange elsewhere in the process. In yet another further embodiment, the first reactor is a vertically oriented reactor, such that the pre-heated mixture flows downwardly through the vertically oriented reactor.

In an alternate embodiment, the water feed can be heated to an elevated temperature to form a heated water stream, such that the heated water stream is in a supercritical state. Highly waxy crude oil is then mixed with the heated water stream in the mixing zone to form the pre-heated mixture, wherein the mixing zone is at a location near a reaction zone, such that the pre-heated mixture remains in a supercritical state. The pre-heated mixture is then fed into the reaction zone, wherein the temperature is increased within the reaction zone to the target temperature that is at or above the critical temperature of water, such that at least some of the hydrocarbons of the pre-heated mixture undergo cracking, forming the hot adapted-mixture, the reaction zone being essentially free of an externally-provided catalyst and essentially free of an externally-provided hydrogen source. The hot adapted-mixture is then cooled down and undergoes a pressure reduction by the pressure regulating device, forming the pressure-reduced adapted-mixture. The pressure regulating device is preferably the back pressure regulator, and more preferably two or more back pressure regulators in parallel. The depressurized adapted-mixture is then separated into the gas portion and the liquid portion using at least one liquid-gas separator, and the liquid portion is separated into upgraded oil and recovered water using at least one oil-water separator. The upgraded oil recovered from the oil-water separator is a crude oil having a reduced point as compared to the highly waxy crude oil.

In an alternate embodiment, the recovered water can be oxidized under supercritical conditions to form the treated water stream, wherein the treated water stream is then recycled back into the process by combining the treated water stream with the water feed. In another embodiment, the thermal energy released from the reaction zone and/or the oxidation step can be captured and made operable for use for heat exchange elsewhere in the process. In yet another further embodiment, the first, reactor is a vertically oriented reactor, such that the pre-heated mixture flows downwardly through the vertically oriented reactor.

In other embodiments of the invention, recovered water from the liquid separation stage can be combined with the hot pressurized water. In yet another embodiment of the invention, the recovered water can be treated in an oxidation reactor prior to combining with the hot pressurized water using an oxidation step, so as to treat the recovered water by removing any oil residue or other impurities. In a further embodiment of this invention, the thermal energy contained in the hot adapted-mixture from the reaction zone and/or the treated water stream from the oxidation reactor can be captured and used for heat exchange anywhere elsewhere in the process. Furthermore, the continuous process can be carried out without the aid of any externally supplied catalysts.

Low pour point feedstock obtained by the present invention has good properties for use in conventional refining processes to produce petroleum products, such as gasoline and diesel. Furthermore, the present invention provides a continuous process to increase aromatic and olefinic contents of highly waxy crude oil to be suitable for conventional refined products and conventional feedstock for petrochemical processes.

The continuous process of the present invention does not require an external supply of hydrogen and/or catalyst to break paraffinic bonds. The absence of external catalyst creates a cost effective process by avoiding the cost of catalyst as well as the operational drawbacks of using external catalyst.

Also, the supercritical water fluid in the continuous process of the present invention suppresses formation of coke as compared to other cracking methods and as a result increases liquid yield. Furthermore, supercritical water fluid facilitates mass transfer which increases reaction speed. In another embodiment, the residence time of the pre-heated mixture within the reaction zone is between 0.1 and 10 minutes, and more preferably between 1 and 3 minutes.

Additionally, the continuous process of the present invention can be easily utilized at the production site of highly waxy crude oil because the preferred embodiment does not require complex equipment or facilities associated with other processes that require hydrogen supply or coke removal systems. Moreover, the low pour point crude oil has high aromatic and olefinic contents, along with low levels of sulfur, nitrogen, metals, coke and impurities, which increases the value of the feedstock because further, costly hydroprocessing can thereby be avoided.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
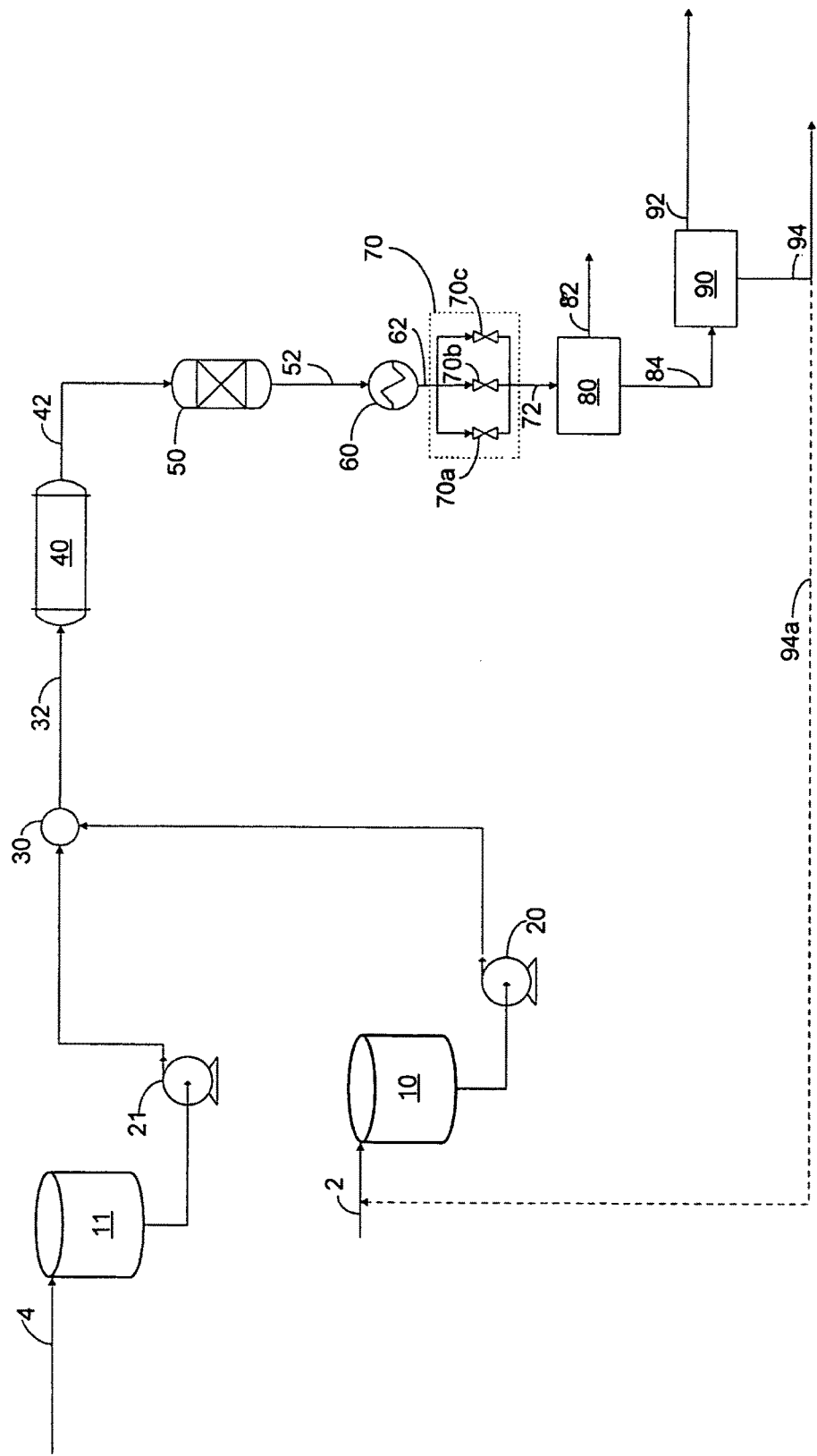
FIG. 1 is a perspective view of a continuous process diagram according to an embodiment of the present invention.

The present invention provides a continuous process for converting highly waxy crude oil into more valuable crude oil feedstock without an external supply of hydrogen. The continuous process generally includes contacting the highly waxy crude oil with hot pressurized water to produce crude oil feedstock having a low pour point, low sulfur content, low nitrogen content, low metal content, high aromatic content, and high olefinic content. This process is conducted in the absence of added hydrogen. Hot pressurized water is above the critical temperature and pressure of water and exhibits unique properties that are used in this invention to achieve desired end results.

Feed crude oil typically has a substantial amount of highly waxy hydrocarbons. The waxy hydrocarbons typically have a pour point higher than 90 degrees F. and are difficult to transfer through pipelines to tanker ships or off-site refining facilities. Additionally, it is often necessary to perform additional hydroprocessing to the feed crude oil due to low levels of aromatic and olefinic compounds in order to meet fuel specifications, such as octane rating of gasoline.

In an embodiment of the present invention, the continuous process of the invention includes the steps of mixing the highly waxy crude oil with high pressure water in the mixing stage to produce the highly waxy crude oil/water mixture, and thereafter exposing the highly waxy crude oil/water mixture to the pre-heating stage, the reaction zone stage, the cooling stage and multiple separating stages. Otherwise, the continuous process of the invention includes the steps of mixing the highly waxy crude oil with pre-heated, high pressure water following the pre-heating stage of water to produce the pre-heated mixture, and thereafter exposing the pre-heated mixture to the reaction zone stage, the cooling stage and multiple separating stages. Thermal energy contained in the hot adapted-mixture from the reaction zone is utilized to heat the feed stream by using suitable economizing equipment. Organic compounds included in recovered water from the separating stage can be fully oxidized with hot pressurized water in the presence of oxygen to obtain clean water for recycling. The thermal energy that is released from the oxidation reaction can also be used for heat exchange purposes elsewhere in the process.

Hot pressurized water provides a reaction medium for the highly waxy components to be cracked into low pour point and low molecular weight hydrocarbons through facilitating mass diffusion, heat transfer, intra- or inter-molecular hydrogen transfer, stabilizing radical compounds for suppressing coke formation and removing impurities such as sulfur, nitrogen and metal containing molecules. While the exact mechanism of the impurity removal has not been identified, the impurities seem to be concentrated in the coke, water or heavy fraction of the upgraded products. Through the use of supercritical water, these impurities are oxidized or otherwise modified to avoid deleterious effects.

According to an embodiment of the present invention, highly waxy crude oil is mixed with water at slightly elevated temperatures in the weight ratio of 10:1 to 1:10, as measured at room temperature. The slightly elevated temperature selected to produce a pumpable liquid. Slightly elevated temperatures are temperatures that are slightly elevated in comparison to ambient temperature. Exemplary elevated temperatures include temperatures in the range of 50-150 degrees C. Heating of the highly waxy crude oil/water mixture or water feed can be provided by heat exchange of the highly waxy crude oil stream (or water stream) with, for example, the product stream exiting from the reaction zone stage using heat exchange equipment known in the art.

The highly waxy crude oil/water mixture is then introduced into the pre-heating stage, which preferably comprises a heater and tube, to increase temperature of feed stream up to 150-350 degrees C. In an alternate embodiment, only the water stream is introduced into the pre-heating stage, which comprises a heater and tube, to increase the temperature of the water stream up to a temperature exceeding the critical temperature of water. Heating for this purpose can be provided by heat exchanging the feed stream with, for example, the product stream, from the reaction zone stage or the treated water stream from the oxidation reactor.

The preheated feed stream is then fed into the reaction zone. The reaction zone, which is surrounded by a heater, increases the temperature of feed stream up to 374-600 degrees C., while maintaining pressure above the critical pressure of water. In the reaction zone, large waxy molecules are broken down into small molecules to have low pour point and good flowing properties. Additionally, contents of aromatic and olefinic compounds are increased through cracking and hydrogen transfer reactions occurred in the reaction zone. Additionally, impurities, such as sulfur, nitrogen and metal containing molecules, are removed in this stage. The product stream from the reaction zone, which is the hot adapted-mixture, is then cooled down and depressurized by the pressure regulating device; creating the depressurized adapted-mixture, which is then separated into the gas portion and the liquid portion by a series of suitable separators.

The liquid portion of the depressurized adapted-mixture is then separated into upgraded oil and recovered water by an oil-water separator. Optionally, the recovered water from the oil-water separator is treated with oxygen under supercritical conditions to remove oily impurities contained in the recovered water by an oxidation reactor to form the treated water stream. Oxygen used for this purpose can be supplied from oxygen gas, hydrogen peroxide, organic peroxide, and air. The treated water stream exiting the oxidation reactor has high thermal energy resulting from the oxidation reaction. Therefore, the treated water stream can be heat exchanged with, for example, the feed stream for the reaction zone and/or oxidation reactor.

The upgraded oil recovered from the oil-water separator contains a reduced amount of waxy components and a larger amount of aromatic and olefinic components than the feed highly waxy crude oil. The distillation curve, which is measured according to ASTM D-86, is also shifted to lower temperatures by this invention. The upgraded oil contains a reduced amount of sulfur, nitrogen, and metallic compounds than the highly waxy crude oil feed. As such, the upgraded oil is more suitable for transferring through pipelines and by tankers. Furthermore, the upgraded oil is high quality feedstock for use in a refining process because of the high amount of olefinic and aromatic compounds and reduced amount of sulfur, nitrogen and metallic compounds.

The continuous process of the present invention is further demonstrated by the following illustrative embodiment, which is not limiting of the continuous process of the present invention.

Properties of highly waxy crude oil which are applicable to the continuous process disclosed in the present invention are listed in Table 1. Pour point is very high (i.e., 105 degrees F.), which means the highly waxy crude oil is solid-state at room temperature (20-30 degrees C.).

TABLE I

Illustrative Embodiment

| Property | Value |
| --- | --- |
| Gravity, ° API | 34.3 |
| Sulfur, Total Weight % | 1.8 |
| Reid Vapor Pressure, psi | 4.1 |
| Pour Point, (Upper), ° F. | 105 |
| Salt, Lbs. NaCl/1000 BBL (PTB) | 1 |
| Ash, wt ppm | 33 |

TABLE I-continued

Illustrative Embodiment

| Property | Value |
| --- | --- |
| Vanadium, wt ppm | 15 |
| Microcarbon Residue, wt % | 3.84 |
| Nickel, wt ppm | 4 |
| Nitrogen, wt ppm | 542 |
| Heating Value, Gross, BTU/Lb | 19091 |
| Kin Viscosity, @ 70° F., SUS | 55.18 |
| Kin Viscosity, @ 100° F., SUS | 42.61 |
| Debutanized Crude Gravity, ° API | 33.20 |
| Characterization Gravity, ° API | 28.60 |

The highly waxy crude oil having properties of Table I is processed by the continuous process of the present invention. In one embodiment, water is pre-heated to 450 degrees C. after pressurizing to more than 22.1 MPa. Highly waxy crude oil is pre-heated to 150 degrees C. and pressurized to exceed 22.1 MPa. The heated water stream and pre-heated highly waxy crude oil are then combined by a suitable mixing device, such as a tee fitting, and then injected to the reaction zone. The temperature and pressure of the reaction zone are maintained at 480 degrees C. and 25 MPa, respectively. From the suitable mixing device to the reaction zone, the mixture is maintained at temperatures and pressures that exceed the critical point of water. The residence time of the mixture in the reaction zone is adjusted to be about three minutes. The output from the reaction zone is used by a heat-exchanger to pre-heat the highly waxy crude oil and the water. The output from the heat exchanger is released to about 0.1 MPa by the pressure regulating device, preferably a back pressure regulator. Output from pressure regulating device is then fed into the liquid-gas separator. The liquid portion from the liquid-gas separator is then fed into an oil-water separator. The oil is collected and analyzed. The total liquid yield is above 90 vol %. The pour point of the liquid product is lower than 10 degrees F. (−12° C.).

Coke formation in the reaction zone is minimized by the presence of supercritical water because radicals generated by thermal energy in the reaction zone are stabilized by supercritical water. Additionally, coke formation is further minimized by maintaining the temperature of the pre-heated highly waxy crude oil below 150 degrees C. Upgrading of highly waxy crude oil with supercritical water fluid does not require an external supply of hydrogen and/or catalyst. Supercritical water fluid also suppresses formation of coke and as a result, increases liquid yield. Furthermore, supercritical water fluid facilitates mass transfer, which increases reaction speed.

FIG. 1 demonstrates an embodiment wherein water feed [2] is fed into water storage tank [10], and water feed [2] is subsequently pumped into the continuous process at mixing zone [30] using high pressure metering water pump [20]. Highly waxy crude oil [4] is similarly, fed into highly waxy crude oil storage tank [11], where highly waxy crude oil [4] is subsequently pumped into the continuous process at mixing zone [30] using high pressure metering highly waxy pump [21]. Mixing zone [30] can be simply a Tee fitting in the line allowing mixing or other mixing devices known in the art. Prior to mixing zone [30], highly waxy crude oil [4] is at a temperature that allows for flow; however, not exceeding 150 degrees C. The two streams combine at mixing zone [30] to form highly waxy crude oil/water mixture [34]. Highly waxy crude oil/water mixture [34] is then fed into heating zone [40], wherein the temperature is increased to a temperature within the range of 150 to 350 degrees C. to form pre-heated mixture [42].

Pre-heated mixture [42] is then fed into main reactor [50], wherein the temperature and pressure are near to or exceed the critical point of water, such that at least some of the hydrocarbons of pre-heated mixture [42] undergo cracking, forming hot adapted-mixture [52], main reactor [50] having a reaction zone that is essentially free of an externally-provided catalyst and essentially free of an externally-provided hydrogen source. Hot adapted-mixture [52] is then cooled using any acceptable means of cooling [60], preferably a heat exchanger, creating a cooled adapted-mixture [62]. Cooled adapted-mixture [62] is then depressurized by pressure regulating device [70] to create depressurized adapted-mixture [72]. In another embodiment, pressure regulating device [70] comprises at least two back pressure regulators, and more preferably three back pressure regulators [70a, 70b, 70c] connected in a parallel fashion. This arrangement advantageously provides for continued operation in the event the primary back pressure regulator becomes plugged. Depressurized adapted-mixture [72] then enters liquid-gas separator [80], wherein depressurized adapted-mixture [72] is separated into gas portion [82] and liquid portion [84]. Liquid portion [84] is then fed into oil-water separator [90] to yield upgraded oil [92] and recovered water [94]. In an alternate embodiment, recovered water [94] can be recycled either before or after water storage tank [10] and re-used as water feed [2].

Figure 2:
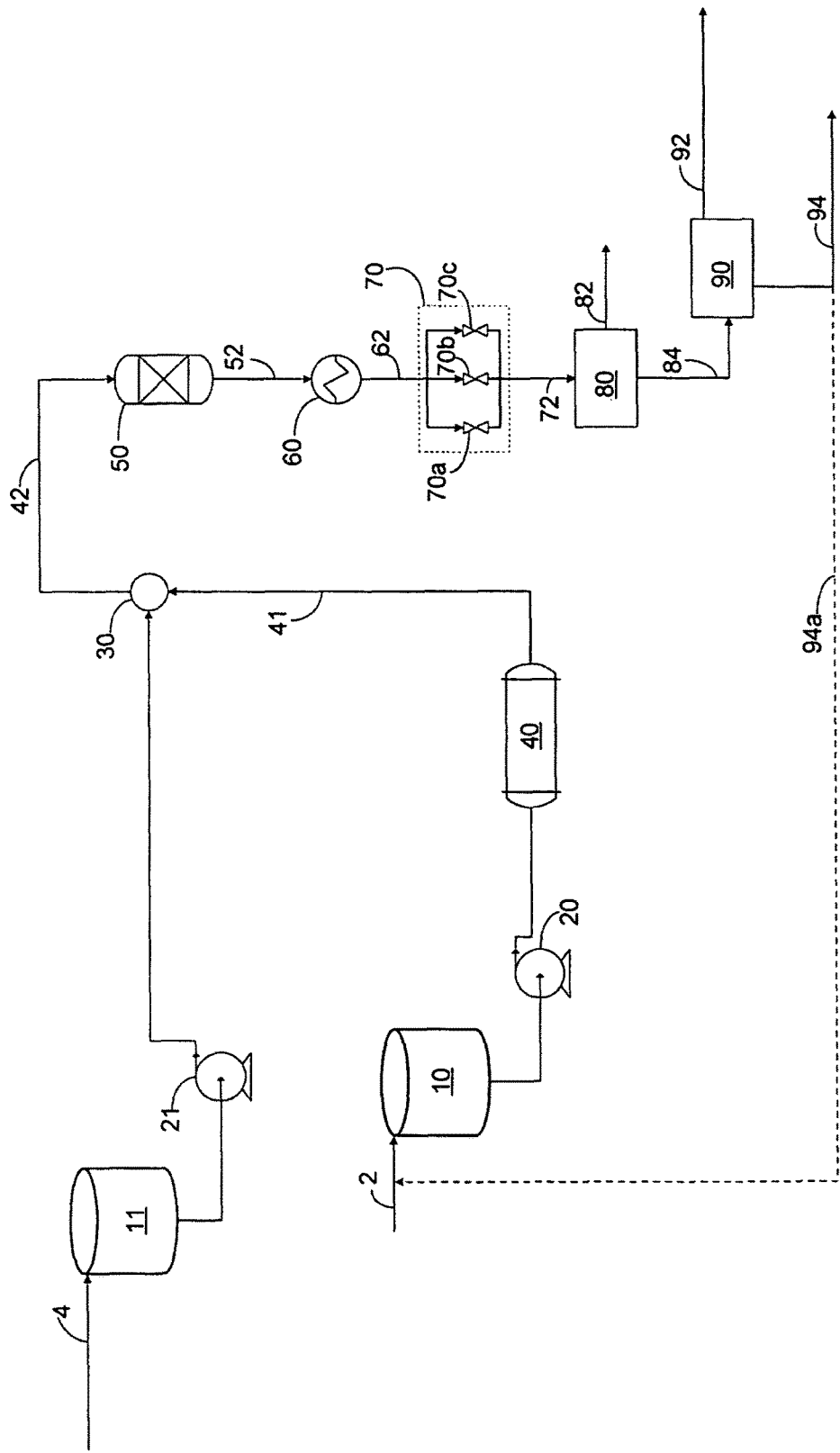
FIG. 2 is a perspective view of a continuous process diagram according to an alternate embodiment of the present invention.

FIG. 2 represents another embodiment in which water feed [2] is pre-heated to supercritical conditions prior to mixing zone [30]. Mixing zone [30] can be simply a Tee fitting in the line allowing mixing or other mixing devices known in the art. In this embodiment, water feed [2] is fed into water storage tank [10], where water feed [2] is subsequently pumped into the continuous process using high pressure metering water pump [20]. However, instead of first mixing with highly waxy crude oil [4], water feed [2] undergoes heating in heating zone [40] to form heated water stream [41], wherein heated water stream [41] is in a supercritical state.

Highly waxy crude oil [4] is similarly fed into highly waxy crude oil storage tank [11], where highly waxy crude oil [4] is subsequently pumped into the continuous process at mixing zone [30] using high pressure metering highly waxy pump [21]. Prior to mixing zone [30], highly waxy crude oil [4] is at a temperature that allows for flow; however, not exceeding 150 degrees C. Highly waxy crude oil [4] and heated water stream [41] combine at mixing zone [30], which is preferably near main reactor [50], to create pre-heated mixture [42].

Pre-heated mixture [42] enters main reactor [50], wherein the temperature and pressure are near to or exceed the critical point of water, such that at least some of the hydrocarbons of pre-heated mixture [42] undergo cracking, forming hot adapted-mixture [52], main reactor [50] having a reaction zone that is essentially free of an externally-provided catalyst and essentially free of an externally-provided hydrogen source. Hot adapted-mixture [52] is then cooled using any acceptable means of cooling [60], preferably a heat exchanger, creating cooled adapted-mixture [62]. Cooled adapted-mixture [62] is then depressurized by pressure regulating device [70] to create depressurized adapted-mixture [72]. In another embodiment, pressure regulating device [70] comprises at least two back pressure regulators, and more preferably three back pressure regulators [70a, 70b, 70c] connected in a parallel fashion. This arrangement advantageously provides for continued operation in the event the primary back pressure regulator becomes plugged. Depressurized adapted-mixture [72] then enters liquid-gas separator [80], wherein depressurized adapted-mixture [72] is separated into gas portion [82] and liquid portion [84]. Liquid portion [84] is then fed into an oil-water separator [90] to yield upgraded oil [92] and recovered water [94]. In an alternate embodiment, recovered water [94] can be recycled either before or after water storage tank [10] and re-used as water feed [2].

Figure 3:
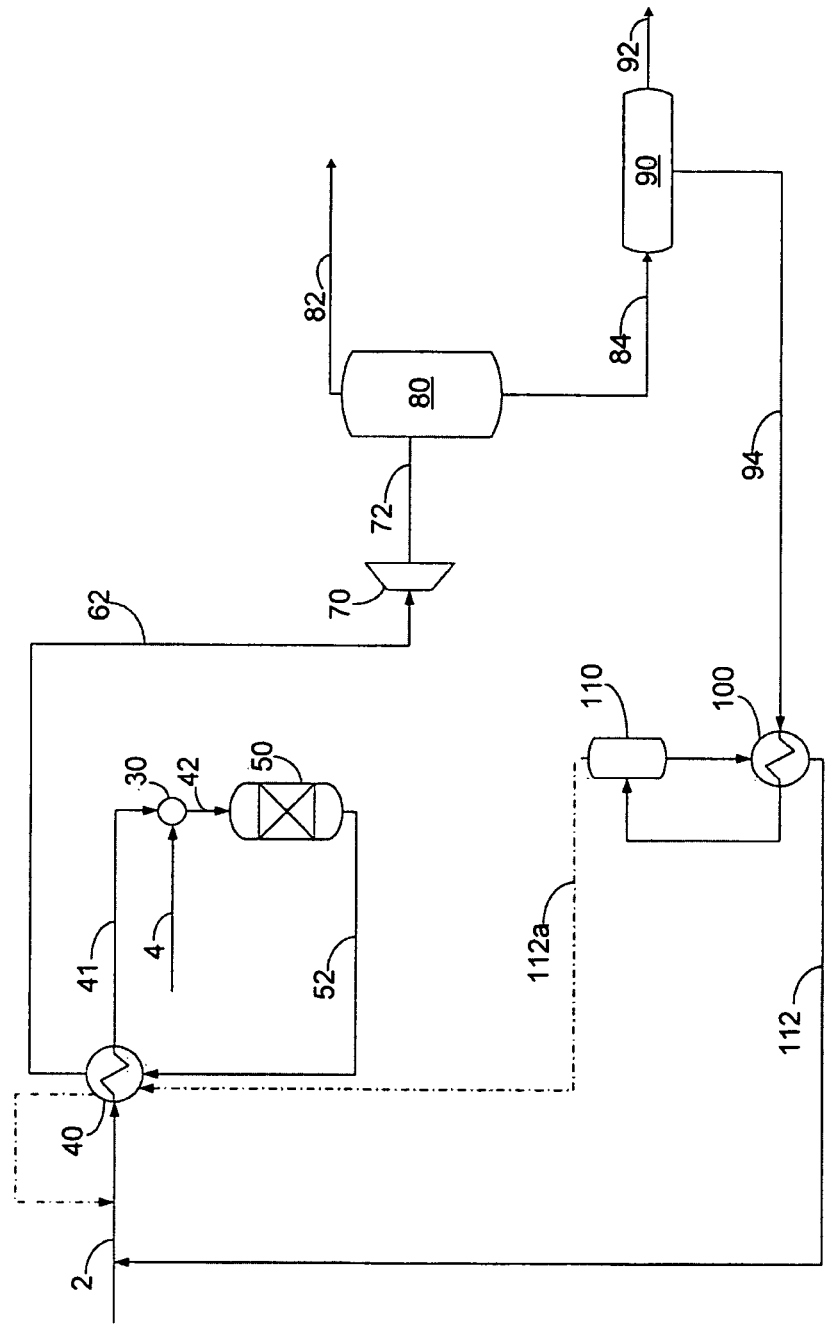
FIG. 3 shows an alternate embodiment of the present invention.

FIG. 3 represents an alternate embodiment of the present invention. Water feed [2] is fed through heating zone [40], which is preferably a heat exchanger, wherein heating zone [40] subjects water feed [2] to temperatures and pressures exceeding the critical point of water, resulting in heated water stream [41] that is in a supercritical state. Highly waxy crude oil [4] is then added to heated water stream [41] at a point [30] near main reactor [50], yielding pre-heated mixture [42]. Pre-heated mixture [42] enters main reactor [50], wherein the temperature and pressure of main reactor [50] are near to or exceed the critical point of water, such that at least some of the hydrocarbons of pre-heated mixture [42] undergo cracking, forming hot adapted-mixture [52], main reactor [50] having a reaction zone that is essentially free of an externally-provided catalyst and essentially free of an externally-provided hydrogen source. Hot adapted-mixture [52] passes back through heating zone [40] where it provides the necessary energy to heat water feed [2]. After passing through heating zone [40], hot adapted-mixture [52] cools down, resulting in cooled adapted-mixture [62]. Cooled adapted-mixture [62] then passes through pressure regulating device [70] resulting in depressurized adapted-mixture [72]. Depressurized adapted-mixture [72] then enters liquid-gas separator [80], wherein depressurized adapted-mixture [72] is separated into gas portion [82] and liquid portion [84]. Liquid portion [84] is then fed into an oil-water separator [90] to yield upgraded oil [92] and recovered water [94].

Recovered water [94] then enters a pre-oxidation heater [100], which is preferably a heat exchanger. Recovered water [94] then enters oxidation reactor [110] and is subjected to increased temperatures and pressures, which preferably exceed 705° F. (374° C.) and 22.1 MPa, respectively. Organic compounds included in recovered water [94] from oil-water separator [90] can be fully oxidized with hot pressurized water in the presence of oxygen to obtain treated water stream [112] for recycling. The dashed line represents an alternate embodiment, wherein the thermal energy from treated water stream [112a] is used by heating zone [40] rather than pre-oxidation heater [100].

As used herein, the terms first and second and the like should be interpreted to uniquely identify elements and do not imply or restrict to any particular sequencing of elements or steps.

While the invention has been shown or described in only some of its forms, it should be apparent to those skilled in the art that it is not so limited, but is susceptible to various changes without departing from the scope of the invention.

We claim:

1. A continuous process for decreasing the pour point of a highly waxy crude oil, the continuous process comprising the steps of:
   mixing the highly waxy crude oil, which has an upper pour point temperature of at least about 90° F. and is introduced into the continuous process at a pressure of at least about the critical pressure of water and at a temperature in a range of from about the upper pour point temperature for the highly waxy crude oil to 150° C., with a water feed, which has a pressure of about at least the critical pressure of water and is at a temperature that does not exceed 150° C., such that the ratio of water to the highly waxy crude oil introduced, as measured at room temperature, is in the range of about 10:1 wt/wt to about 1:10 wt/wt to form a highly waxy crude oil/water mixture;
   pumping the highly waxy crude oil/water mixture to a heating zone such that the highly waxy crude oil/water mixture is at a pressure of at least the critical pressure of water;
   heating the highly waxy crude oil/water mixture in the heating zone to a temperature in the range of from about 150° C. to about 350° C. to form a pre-heated mixture, where the pre-heated mixture is at a pressure of at least the critical pressure of water;
   feeding the pre-heated mixture into a reaction zone and maintaining the pre-heated mixture in the reaction zone for a period in a range of from about 0.1 to about 10 minutes at a temperature of at least the critical temperature of water and at a pressure of at least the critical pressure of water such that at least some of the hydrocarbons of the pre-heated mixture undergo cracking, forming a hot adapted-mixture, where the reaction zone is essentially free of any externally-provided catalyst;
   cooling and depressurizing the hot adapted-mixture to a pressure of about 0.1 MPa to form a depressurized adapted-mixture;
   separating the depressurized adapted-mixture into a gas portion and a liquid portion using at least one liquid-gas separator;
   separating the liquid portion into an upgraded oil and a recovered water using at least one oil-water separator, where the upgraded oil has an upper pour point value of at most about 10° F. and has a total liquid yield of at least about 90 volume % of the introduced highly waxy crude oil;
   where the continuous process uses a reactor zone having at least one reactor that is operable to maintain the highly waxy crude oil/water mixture for a period of time at a temperature of at least about the critical temperature of water and at a pressure of at least about the critical pressure of water, and where neither hydrogen nor catalytic cracking catalyst are introduced into the continuous process.

2. The continuous process of claim 1 further comprising:
   introducing a supplied oxygen to the continuous process;
   oxidizing the recovered water with the supplied oxygen at supercritical conditions for the recovered water to form a treated water; and
   recycling the treated water by combining the treated water with the water feed;
where the supplied oxygen is selected from the group consisting of hydrogen peroxide, organic peroxide and combinations thereof.

3. The continuous process of claim 1 where the ratio of water to highly waxy crude oil introduced is in the range of 10:1 to 1.5:1.

4. The continuous process of claim 1 where the ratio of water to highly waxy crude oil is introduced in the range of 1:3 to 1:10.

5. The continuous process of claim 1 where the reaction zone maintains the temperature of the pre-heated mixture in a range of from about 475° C. and about 600° C.

6. The continuous process of claim 1 further comprising:
   introducing a supplied oxygen to the continuous process;

oxidizing the recovered water with the supplied oxygen at supercritical conditions for the recovered water to form a treated water; and recycling the treated water by combining the treated water with the water feed;

where the supplied oxygen is selected from the group consisting of hydrogen peroxide, organic peroxide and combinations thereof.

7. The continuous process of claim 1 where the highly waxy crude oil has an upper pour point temperature of at least about 105° F.

8. The continuous process of claim 1 where the reactor zone maintains the pre-heated mixture for a period in a range of from about 1 to about 3 minutes.

9. The continuous process of claim 1 where the reactor zone maintains the pre-heated mixture at a temperature in a range of from about the critical temperature of water to about 600° C.

10. The continuous process of claim 1 where the reactor zone maintains the pre-heated mixture for about 3 minutes at a temperature of about 480° C. and at a pressure of about 25 MPa.

* * * * *